United States Patent
MacDonald et al.

(10) Patent No.: US 11,539,758 B2
(45) Date of Patent: Dec. 27, 2022

(54) SYSTEM, METHOD, AND APPARATUS FOR IP-BASED RADIO COMMUNICATIONS

(71) Applicant: InterTalk Critical Information Systems Inc., Dartmouth (CA)

(72) Inventors: Matthew Keith MacDonald, Halifax (CA); James Richard William Birchall, Dartmouth (CA); Kirk William Preeper, Halifax (CA); Kyle Alexander Ross, Mabou (CA)

(73) Assignee: Intertalk Critical Information Systems Inc., Dartmouth (CA)

( * ) Notice: Subject to any disclaimer, the term of this patent is extended or adjusted under 35 U.S.C. 154(b) by 0 days.

(21) Appl. No.: 17/151,494

(22) Filed: Jan. 18, 2021

(65) Prior Publication Data
US 2022/0232048 A1    Jul. 21, 2022

(51) Int. Cl.
*H04L 65/1023* (2022.01)
*H04W 92/02* (2009.01)
*H04W 88/16* (2009.01)
*H04L 65/75* (2022.01)

(52) U.S. Cl.
CPC ........ *H04L 65/1023* (2013.01); *H04L 65/765* (2022.05); *H04W 88/16* (2013.01); *H04W 92/02* (2013.01)

(58) Field of Classification Search
CPC .. H04L 65/1023; H04L 65/605; H04W 88/16; H04W 92/02
See application file for complete search history.

(56) References Cited

U.S. PATENT DOCUMENTS

| | | | |
|---|---|---|---|
| 7,782,826 B2 | 8/2010 | Olivier et al. | |
| 9,736,194 B1* | 8/2017 | Rao | H04L 65/608 |
| 10,085,124 B2 | 9/2018 | Patel et al. | |
| 10,681,506 B1* | 6/2020 | Walker | H04L 65/1063 |
| 10,959,062 B1* | 3/2021 | Walker | H04W 4/10 |
| 2005/0276391 A1* | 12/2005 | Ibbotson | H04M 3/51 379/242 |
| 2011/0107082 A1* | 5/2011 | Blom | H04L 65/608 713/150 |
| 2018/0295164 A1* | 10/2018 | Li | H04L 65/1069 |
| 2019/0281096 A1* | 9/2019 | Mazzarella | H04N 7/152 |
| 2022/0040373 A1* | 2/2022 | Sato | C08F 220/20 |

* cited by examiner

*Primary Examiner* — Afshawn M Towfighi
(74) *Attorney, Agent, or Firm* — Brion Raffoul; Natalie Raffoul

(57) ABSTRACT

System, method, and apparatus for Internet Protocol (IP) based radio communications. One or more browser-based dispatch consoles connect to one or more Radio over IP (RoIP) gateway device over an untrusted network (e.g., the public Internet) using a Web Real-Time Communication (WebRTC) connection secured with SSL/TLS. Each RoIP gateway device provides an analog interface to the radio domain so as to communicate with one or more radio. This architecture avoids any ongoing connection to a centralized cloud-based server and maintains secure radio communications over the untrusted network. Each browser-based dispatch console accesses each RoIP gateway device from a standard web browser thus enabling portability across any platform that supports a browser.

16 Claims, 3 Drawing Sheets

SYSTEM, METHOD, AND APPARATUS FOR IP-BASED RADIO COMMUNICATIONS

TECHNICAL FIELD

The present invention relates to telecommunications. More specifically, the present invention relates to radio dispatch communications for Internet Protocol (IP) based communications over untrusted networks such as public Internet.

BACKGROUND

In the field of radio dispatch communications, remote telecommunications between a dispatch console and a physically distanced radio device will typically occur over what is termed a land mobile radio system (LMRS). An LMRS may be public or private. Typically, such systems provide person-to-person voice communication consisting of two-way radio transceivers (an audio transmitter and receiver in one unit) which may be stationary (base station units), mobile (installed in vehicles), or portable (handheld units). Public land mobile radio systems are common to public safety organizations such as police, fire, and ambulance services, and other governmental organizations, and use special frequencies reserved for these services. Private land mobile radio systems are typically for private commercial use, by firms such as taxis or delivery services. Most such systems use radio channels in the VHF or UHF bands and transmitter power is usually limited to around 5 watts, giving them a limited range, usually 3 to 20 miles (4.8 to 32 km) depending on terrain, although repeaters installed on tall buildings, hills or mountain peaks may be used to increase the coverage area. Older systems use AM or FM modulation, while some recent systems use digital modulation allowing them to transmit data as well as sound.

Such systems may include as few as two subscriber units (e.g., mobile units installed in law enforcement vehicles) communicating between themselves and a primary site (e.g., law enforcement dispatch headquarters) over preset channels, or they may be more complex, consisting of hundreds of subscriber units and multiple sites. Indeed, LMRS may be configured to cover large geographical areas by providing hundreds of sites. In a centralized LMRS, telecommunications among sites are setup through one or more centralized switches and devices may be analog or digital. In contrast, telecommunications involving multiple sites are setup by the sites directly and without the use of centralized switches. This is accomplished by way of digital networks where the telecommunications are carried using Voice over Internet Protocol (VoIP) technology and which has become more and more common as cloud-based technology advances.

Within LMRS, users are divided into groups where users within a group may talk to one another using their radios. Dispatchers may then interface with the given LMRS by using a computer having speakers and a dynamic graphical display (i.e., a dispatch console). In essence, dispatchers may select one of several predefined groups of users and communicate to the selected group, while members of the groups may communicate with one another.

Dispatch software is typically provided within the given dispatch console and serves as a bridge between existing radio, telephony, analog, digital, and data communications, ensuring dispatchers have the tools they need to maintain safety and keep operations running seamlessly. Moreover, because such dispatch consoles may be used by police and fire departments, railways, and enterprises otherwise pertaining to public safety, utility, and transportation, survivability and scalability of dispatch consoles is desirable.

In terms of resilience of cloud-based dispatch consoles, browsers and web communications standards are utilized over the public Internet. However, private networks and/or virtual private network (VPN) protocols are typically required for such implementations with concomitant costs and complexities.

Current solutions utilize VPNs and native applications which require significant network administration effort and cost to manage. VPNs are practically limited to connecting all clients to a single network which creates both management and security concerns. Native Applications require unique coding for each platform. This custom work increases defects and staff costs while slowing innovation and feature improvements. The limitations of present solutions include the cost of computational power required to process audio streams in a centralized cloud server model. While cloud servers may be scaled up to provide more computational output, this comes at an additional cost.

One prior art attempt includes United States Patent Application Publication No. 2010/0227583 to Roy et al. entitled "Land Mobile Radio Dispatch Console". Roy et al. disclosed an exemplary land mobile radio dispatch console and method are provided. In one embodiment, the console has the capability to process and handle Requests To Talk (RTT) and emergencies. In another embodiment, the console has the capability to provide a history. In another embodiment, the console provides the capability for operators to configure and save patches of predefined groups for later use. In another embodiment, the console includes a telephone interconnect interface component, and combinations of features mentioned above.

Another prior art attempt includes U.S. Pat. No. 7,782,826 to Olivier et al. entitled "Radio Gateway System And Method For Interfacing A Radio System And An IP Network". Olivier et al. discloses a radio gateway system and method for interfacing one or more radio systems and a packet network. The system comprises a plurality of gateways, each gateway including a radio interface port, a protocol converter and packet interface. The gateways convert audio and signaling from the radio system into packet signals in a generic protocol. The gateways also convert packet signals in the generic protocol into audio and signaling in a protocol understandable by a respective radio system.

Yet another prior art attempt includes U.S. Pat. No. 10,085,124 to Patel et al. entitled "System And Method To Leverage Web Real-Time Communication For Implementing Push-To-Talk Solutions". Patel et al. discloses a system and method to leverage Web Real-Time Communication (WebRTC) for implementing Push-to-Talk (PTT) solutions. One or more servers interface to a communications network to perform advanced voice services for one or more wireless or wired user devices, wherein the advanced voice services include a two-way half-duplex voice call within a group of the user devices comprising a PTT call session. At least one of the user devices communicates with at least one of the servers during the PTT call session using a WebRTC connection, and at least the media streams for the PTT call session are transmitted between the server and the user device using the WebRTC connection.

What is desired is a radio dispatch console which utilizes IP-based communications over the Internet while overcoming the disadvantages of the prior art.

SUMMARY

The present invention provides a browser-based distributed cloud dispatch console whereby dispatchers may be safely connected directly to the radio resources they need to communicate upon rather than relying on back-office or cloud equipment. The present invention also provides dispatchers more geographic flexibility than traditional dispatch systems as the invention enables dispatchers to work from anywhere with Internet access. The present invention provides computation at the Radio-over-IP (RoIP) gateway devices rather than a centralized cloud server and thus allows for a greater number of simultaneous audio streams and thereby more complex Digital Signal Processing (DSP) may be performed. The present invention also provides for secure real-time communications over the Internet by utilizing WebRTC secured with Secure Sockets Layer/Transport Layer Security (SSL/TLS) protocols.

In a first aspect, the present invention provides a system for providing radio communications of data over digital networks, the system including: at least one browser-based dispatch console, the console configured to communicate using a Web Real-Time Communication (WebRTC) connection; at least one Radio over Internet Protocol (RoIP) gateway device for communicating with the console, the RoIP gateway device including at least an Internet media module, and a radio interface module; and wherein the RoIP gateway device processes the data between a digital domain and an analog domain.

In a second aspect, the present invention provides a method for communicating Internet Protocol (IP) based radio communications of data over digital networks, the method including: configuring at least one browser-based dispatch console to communicate the data using a Web Real-Time Communication (WebRTC) connection; and processing the data between a digital domain and an analog domain using a Radio over Internet Protocol (RoIP) gateway device including at least an Internet media module, and a radio interface module.

In a third aspect, the present invention provides an apparatus forming a Radio over Internet Protocol (RoIP) gateway device, the apparatus including: an Internet media module for communicating with at least one browser-based dispatch console, the console configured to communicate using a Web Real-Time Communication (WebRTC) connection; a radio interface module for converting audio data between analog domain and digital domain; and wherein the RoIP gateway device is located at an edge of a network opposite the console.

BRIEF DESCRIPTION OF THE DRAWINGS

The present invention will now be described by reference to the following figures, in which identical reference numerals refer to identical elements and in which.

DETAILED DESCRIPTION

The present invention differs from prior centralized approaches where all audio and control data streams are processed in a centralized cloud server from a native application. Instead, the present invention processes all such data streams at an edge device. In accordance with the present invention, audio streams do not connect directly to the remote device from a browser-based dispatch console. Moreover, the present invention does not require VPN to secure the connection over the Internet nor any custom IP protocols. By pushing computation to the edge of the cloud, a larger number of audio streams may be supported by the inventive browser-based dispatch console along with the use of more complex digital signal processor (DSP) algorithms.

The following acronyms and corresponding descriptions are provided so as to aid the understanding of the present disclosure.

Figure 1:
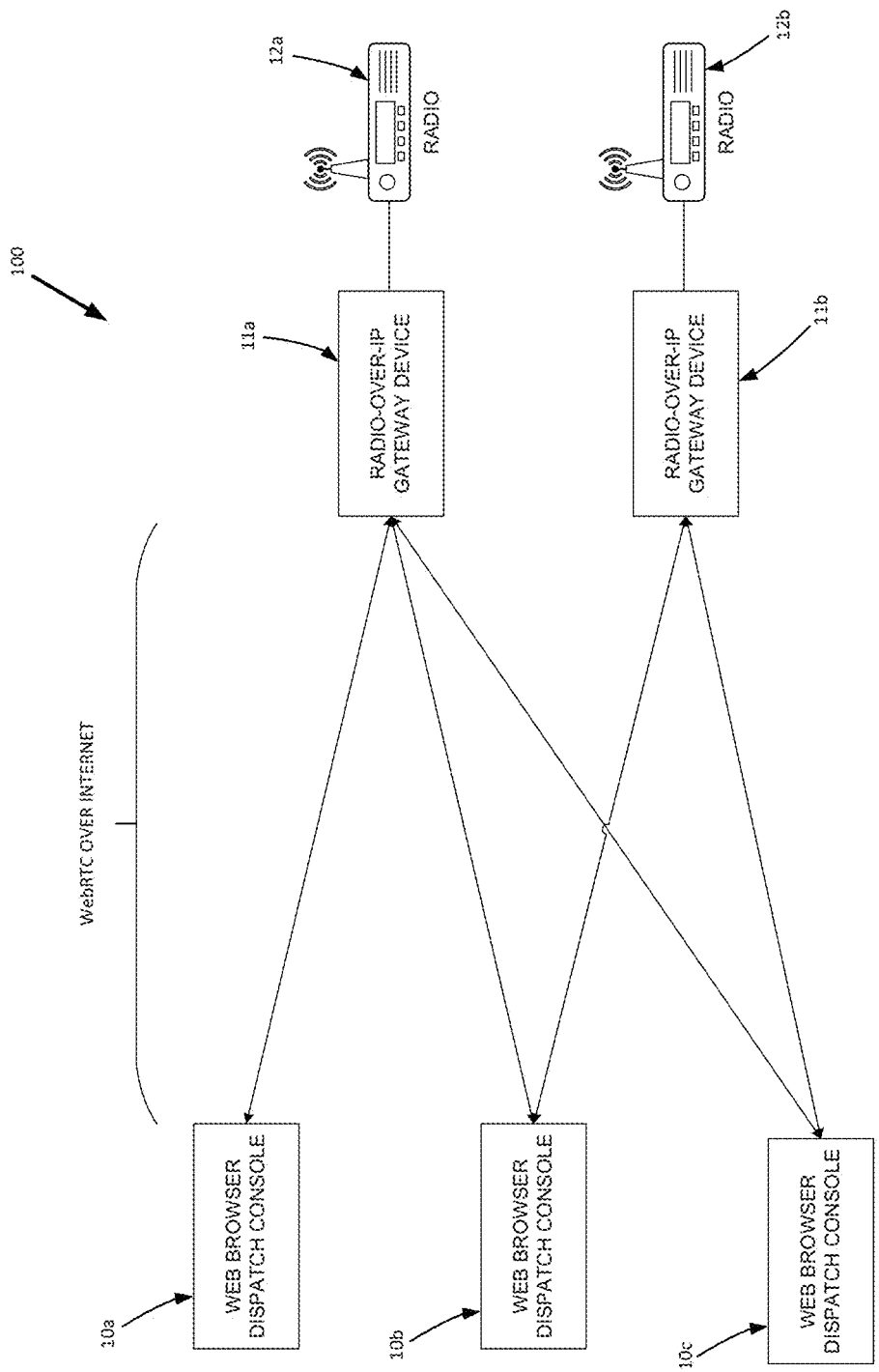
FIG. 1 is a generalized schematic of the system architecture showing multiple browsers, RoIP gateways, and radios arranged in one possible configuration in accordance with the present invention.

Referring now to FIG. 1, the present invention as shown is embodied in a distributed cloud architecture 100 for IP-based radio communications. The architecture 100 includes one or more browser-based dispatch consoles 10a, 10b, 10c where each browser-based dispatch console 10a, 10b, 10c connects directly to one or more RoIP gateway device 11a, 11b over the public Internet using WebRTC secured with SSL/TLS. Each RoIP gateway device 11a, 11b provides an analog interface to the radio domain so as to communicate with one or more radio 12a, 12b. While the public Internet is discussed herein, it should be noted that the present invention may be implemented in terms of the public Internet or any analogous untrusted and uncontrolled network in any combination with or without connections over semi-private networks (e.g., large corporate networks, public-safety specific networks, . . . etc.). As well, it should be readily apparent that any number of consoles, RoIP gateway devices, and radios may be utilized without straying from the intended scope of the present invention, and therefore the number of each generally illustrated in FIG. 1 should not be considered limiting.

As mentioned, the present invention advantageously provides a direct connection between each browser-based dispatch console 10a, 10b, 10c and each RoIP gateway device 11a, 11b over the public Internet using a WebRTC connection secured with SSL/TLS. Aside from initial call setup which may include a cloud-based token broker (further described below with regard to FIG. 2), this architecture avoids any ongoing connection to a centralized cloud-based server and maintains security over the public Internet. It should be understood that any cloud-based token broker may be embodied by an authentication server resident in the Internet cloud, though alternative mechanisms may be provided without straying from the intended scope of the present invention. The ability for each browser-based dispatch console 10a, 10b, 10c to directly access each RoIP gateway device 11a, 11b from a standard web browser enables portability across any platform that supports a browser.

In particular, each browser-based dispatch console 10a, 10b, 10c connects directly to each RoIP gateway device 11a, 11b using a WebRTC connection over the public Internet secured with SSL/TLS whereby the standard browser of each console is provided with a progressive web application. A progressive web application is a type of application software delivered through the web, built using common web technologies including HTML, CSS and JavaScript. Typically, progressive web applications are intended to work on any platform that uses a standards-compliant browser, including both desktop and mobile devices. It should be noted that progressive web applications may be packaged as an executable application file and stored offline or distributed through software application stores like Google Play, Apple App Store, Windows Marketplace, AT&T FirstNet, and the like thereby providing offline and distribution advantages. In this manner, the progressive web application is a mechanism for a browser to be used to access the RoIP gateway device in accordance with the present invention.

In the present invention, the progressive web application used to distribute the browser-based dispatch console software may be accomplished through third-party app stores (e.g., Google Play, Microsoft Marketplace, AT&T FirstNet, etc. . . . ). The progressive web application may be used to offer functionality even if parts of the distribution infrastructure (e.g., an App store) are offline. As well, the progressive web application may be used to offer functionality that is specific to smartphone and tablet devices such as, but not limited to, battery management and lock screen displays.

The connections between each browser-based dispatch console 10a, 10b, 10c and each RoIP gateway device 11a, 11b are preferably made using WebRTC to negotiate audio and control data streams between each console 10a, 10b, 10c and RoIP device. Connection establishment may be negotiated through various known network address translation (NAT) infrastructure using the STUN/TURN/ICE features of WebRTC to ensure that connections are possible over large heterogenous internetworks as exemplified by the public Internet. Session Traversal Utilities for NAT (STUN) protocol enables a device to discover its public IP address. Traversal Using Relays around NAT (TURN) protocol enables a server to relay data packets between devices. Interactive Connectivity Establishment (ICE) protocol enables devices to communicate its public IP address and connect to other devices. The STUN/TURN/ICE of NAT infrastructure are known and will not be further described herein.

Authentication and authorization to access the RoIP gateway is accomplished using a one-time-use token which is distributed by a central registrar with which both the RoIP gateway device and the progressive web application deployed within each browser-based dispatch console 10a, 10b, 10c communicate. The browser-based dispatch console 10a, 10b, 10c receives a single access token that the RoIP gateway has pre-shared with the central registrar after the RoIP gateway has authenticated with that central registrar by known methods familiar to those of skill in the authentication arts and that the central registrar has provided to the user of each browser-based dispatch console 10a, 10b, 10c based on internal authority lists that validate that the user is authorized to access the specific RoIP gateway.

One-time-use tokens are randomised large strings generated uniquely by each RoIP gateway and are never shared by multiple RoIP gateways nor reused after they have been used to connect once. To prevent reuse, after a token is used in a connection, the used token is stricken from the internal list of valid tokens that is maintained by the RoIP gateway.

To share tokens, RoIP gateways use their own individual authentication tokens to access the central registry. If a central registry is compromised and additional tokens are added, the RoIP gateway is never informed and such illegitimate tokens will never be valid. In this way, the RoIP gateway retains full control over what is and what is not a valid one-time-use token.

Audio data (idealized as a stream of related data packets) passed between the RoIP gateway device 11a, 11b and the browser negotiate audio codec selection (e.g., between uLaw/aLaw compandered audio and Opus audio codecs). It should be understood that uLaw/aLaw are two known algorithms that are used in modifying an input signal for digitization. These algorithms are implemented in telephony systems all over the world. Opus is a totally open, royalty-free, highly versatile audio codec. Such selection depends upon the shared capabilities of the RoIP device, associated browser, and configured preferences using standard software defined perimeter (SDP) mechanisms embodied in WebRTC. SDP works to provide the same user experience to those on-premise or beyond a network's perimeter while granting access to only the resources users need.

Separately negotiated control messaging that operate in-band to the audio streams is used to enable specific LMRS features (e.g., Push-To-Talk priorities, talk group, frequency channels, emergency alert tones, etc. . . . ) and reuse connection pathing detected during initial setup by the STUN/TURN/ICE traversal methods of WebRTC.

Once audio traffic arrives at each side of the WebRTC over Internet connection (the RoIP gateway and the browser progressive web application), the audio traffic is decrypted and decoded into unencoded audio data. This enables location specific digital signal processing that may shape the final delivered audio data based on factors that are not shared with the other party (e.g., selecting a voter site in a software voter, archival data recording, etc. . . . )

Multiple audio streams from connected parties that are destined for the same RoIP channel are mixed, noise reduced, volume adjusted and clipped by the RoIP gateway device 11a, 11b and sent over the air or reflected to other parties that are listening. This allows for the atomic selection of audio source (e.g., a PTT Gate) while allowing heterogenous connections to deliver audio with encodings that are specifically selected as ideal for that connection (e.g., a low bandwidth/high latency connection versus a high bandwidth/low latency connection).

Multiple audio streams that are received from diverse audio sources in the browser (e.g., a connected Bluetooth microphone, a video or audio file, a simultaneously connected radio channel, a telephone call, or the like) may be independently patched (i.e., mixed), leveled, and noise-cancelled into any other connected RoIP device. This browser-based mixing allows for diverse media to be sent to and received from multiple audio devices (e.g., RoIP, telephony, web cameras, microphones, files, etc. . . . ) without the RoIP gateway device 11a, 11b needing to understand how to mix, decrypt, encrypt, encode or decode protocols that it is incapable of interpreting. Further, this browser-based patching allows for human-mediated connections of devices temporarily and on demand without having to permanently interconnect the devices with dedicated network interconnects. Each source is connected to the browser and then the browser (as directed by the user) sends the processed source onward to the associated RoIP device.

The inventive RoIP gateway device may be embodied in the form of a dedicated hardware platform. The embodiment is an embedded device consisting of a microprocessor, general purpose input/output (GPIO) controlled relay outputs, opto-isolated digital inputs, hardware audio codecs, general purpose operating system (e.g., Ubuntu), software based radio voter, radio base-station controller, radio media controller, radio digital signal processor, radio push-to-talk controller, session initiation protocol (SIP) registrar, WebRTC gateway, SSL/TLS encryption software and associated software audio codecs (e.g., uLaw, aLaw, opus, etc. . . . ). Such hardware device connects analog radios (e.g., 4 wire LMR) and digital radios (e.g., P25) to an SSL/TLS secured WebRTC software service (i.e., progressive application delivered) available over an Ethernet connected IP network.

Connected analog radios are controlled using relays to unsquelch associated analog radio receive audio (Rx), transmit audio (Tx) and opto-isolated inputs to detect Carrier Operated Relay (COR). Alternatively, the radio may be controlled using inline signalling techniques such as Tone Remote Control (TRC) to change channels and enable custom functionality offered by specific analog radio mobile manufacturers. The audio is converted from the digital to analog domain using the onboard hardware audio codec and associated radio interface module software.

In the digital domain, signals (both Tx/Rx) are passed through a series of DSP filters which adjust levels, remove noise, interpret inaudible control signals and generate pure tones for maintenance analysis and infrastructure control.

Various modifications of the present system may be possible without straying from the intended scope of the invention. In particular, the RoIP gateway device 11a, 11b may include another Real-Time Communication device such as an IP-capable base station radio (e.g., P25, DMR, etc.), PA systems, phones, sensors, or cameras.

While a web browser is a preferred embodiment of the present invention, a dispatch console not based in a web browser may alternatively be used. However, in accordance with the present invention, such a non-browser-based dispatch console must still use WebRTC protocols as a means of controlling the RoIP gateway device 11a, 11b and negotiating the particulars of the connection and associated data streams. An example of such a non-browser-based dispatch console would be an existing/traditional dispatch console that was extended to communicate with the RoIP gateway device 11a, 11b using WebRTC network protocols and which implemented SSL/TLS encryption, and which implemented compatible audio codecs, and which implemented RoIP WebRTC specific device control signals (e.g., PTT control) using an in-band signalling protocol.

Figure 2:
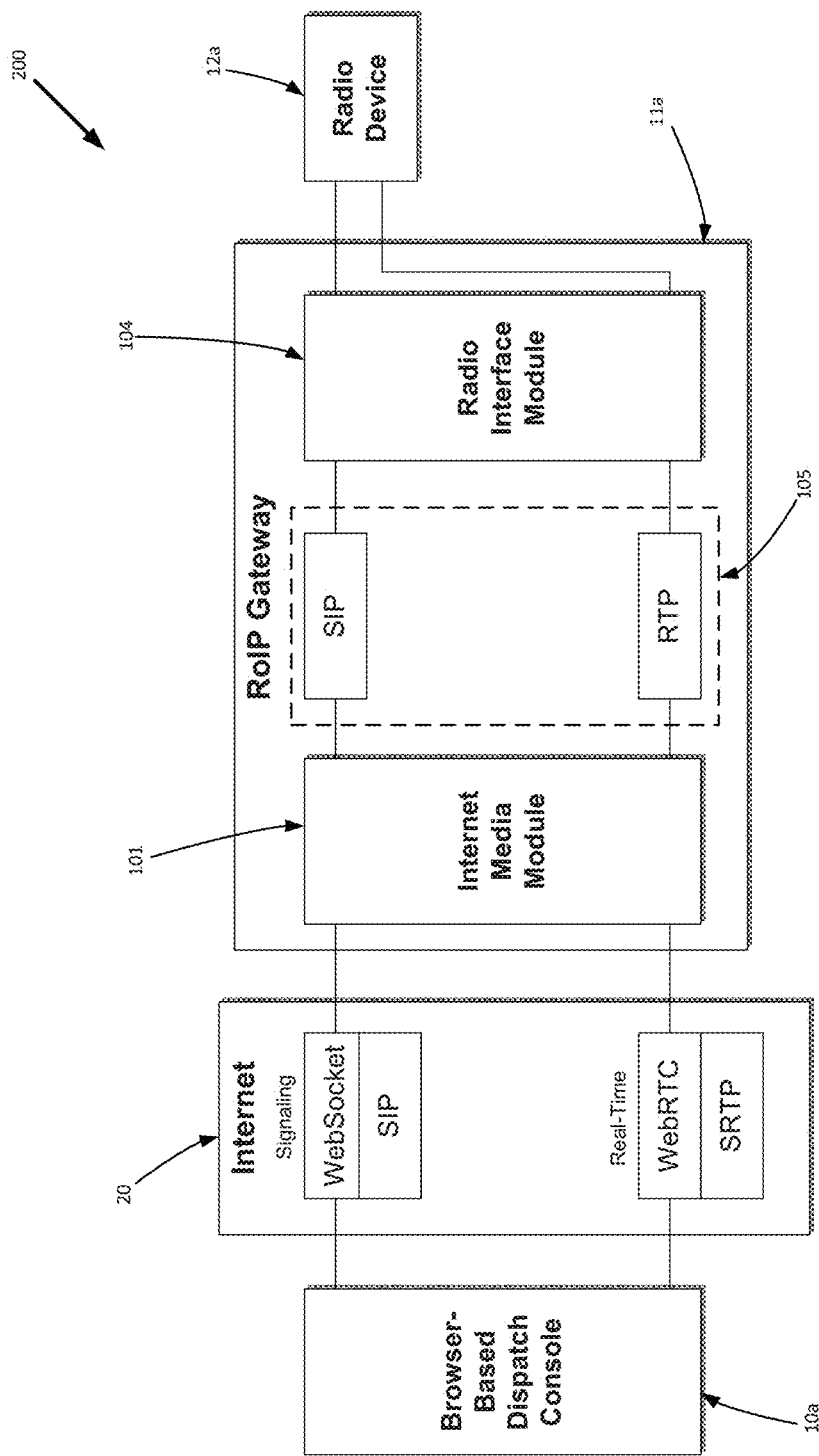
FIG. 2 is a block diagram showing the apparatus in accordance with the present invention.

With regard to FIG. 2, a system 200 in accordance with a preferred embodiment of the present invention is shown. The system 200 includes at least one browser-based dispatch console 10a communicating over Internet 20 with at least one radio device 12a via at least one RoIP gateway device 11a. It should be understood that the Internet 20 provides a mechanism for signaling using WebSocket and session initiation protocol (SIP) while real-time communications are provided via WebRTC and Secure Real-Time Transport Protocol or Secure RTP (SRTP). The system 200 provides for real-time media data flow continuously and bidirectionally between the browser-based dispatch console 10a and the RoIP gateway device 11a until a communication session is ended.

The RoIP gateway device 11a includes at least an Internet media module 101, a SIP/RTP module 105, and a radio interface module 104. The Internet media module 101 functions as an interface with the public Internet and provides audio data processing to and from encrypted signaling and transport protocols in the web domain. The SIP/RTP module 105 functions as an interface between the Internet media module 101 and the radio interface module 104 and provides data processing to and from RTP/SIP protocols in the digital domain. It should be noted that the functionality of data processing to and from RTP/SIP protocols may be incorporated into the radio interface module 104 itself. In either scenario, the RoIP gateway device 11a translates the audio data from SRTP to RTP and finally to the radio interface module 104 which converts the digital audio using audio codecs to the analog domain whereupon the radio interface module 104 then connects to the physical radio 12a for transmission over-the-air.

Figure 3:
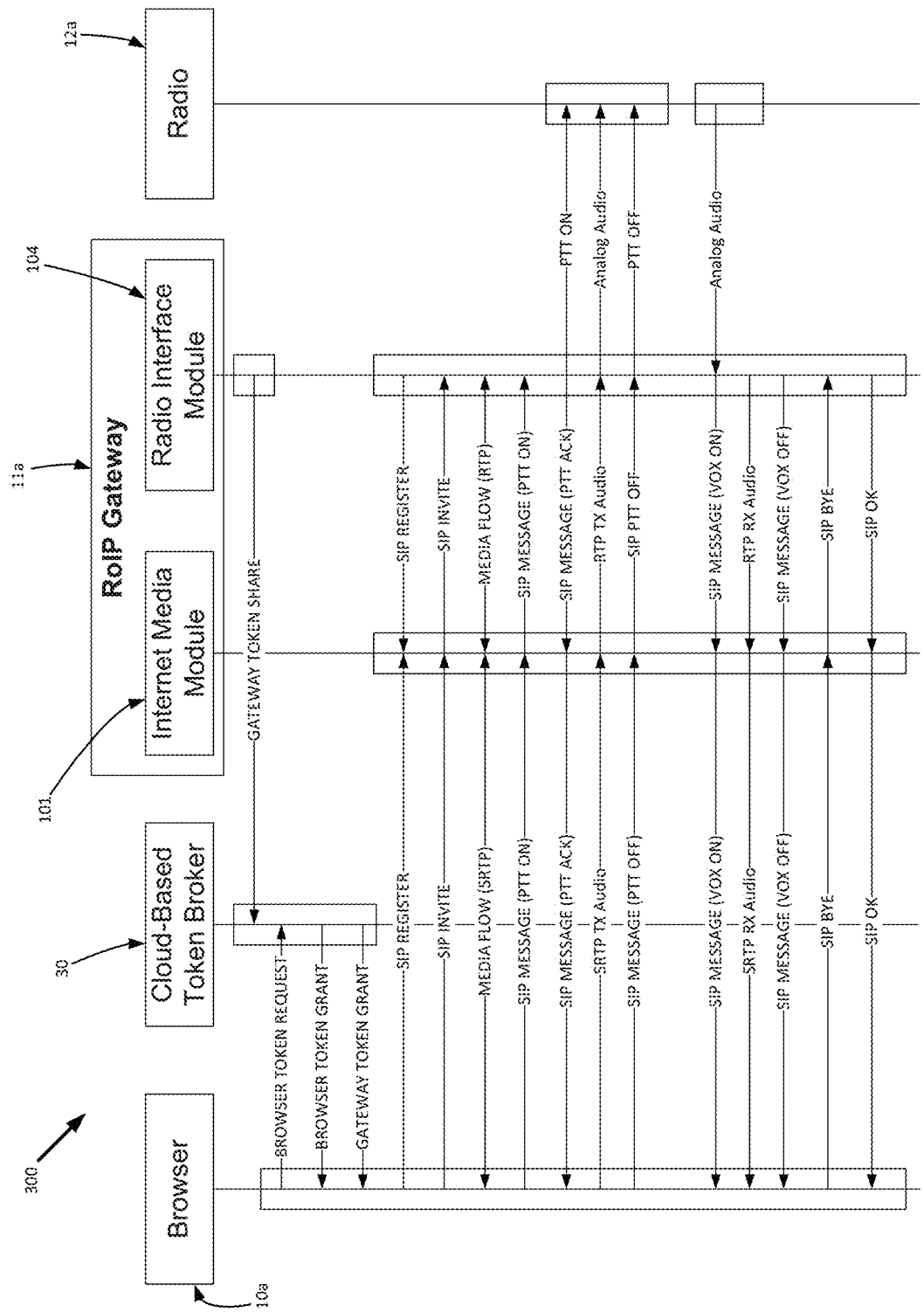
FIG. 3 is a workflow diagram showing a life cycle of a call session in accordance with the present invention.

With regard to FIG. 3, a workflow diagram is shown, and which illustrates establishment of a call embodying IP-based radio communications in accordance with the present invention. Initially, the RoIP gateway 11a periodically sends, i.e., pushes, a one-time-use token to a cloud-based token broker 30 to execute a gateway token share. In a similar manner, the browser-based dispatch console 10a embodied in a browser will, upon initiation by a dispatch user (not shown) located at the browser-based dispatch console 10a, execute a browser token request to the cloud-based token broker 30. The token of the RoIP gateway 11a and the token of the browser-based dispatch console 10a each therefore may form a matched set of tokens.

It should be understood that time-synchronized one-time passwords (i.e., one-time-use tokens) change constantly at a set time interval—e.g., once per minute. To accomplish this, synchronization must exist between the token of the RoIP gateway 11a and the token of the browser-based dispatch console 10a. Such synchronization is provided by the cloud-based token broker 30. Other types of one-time use tokens may be utilized without straying from the intended scope of the present invention. For example, a one-time use token which uses a complex mathematical algorithm, such as a hash chain, to generate a series of one-time passwords from a secret shared key. Each password is unguessable, even when previous passwords are known. Each password is observably unpredictable and independent of previous ones, whereby an adversary would be unable to guess what the next password may be, even with knowledge of all previous passwords.

With continued reference to FIG. 3, the workflow continues once the token of the RoIP gateway 11a and the token of the browser-based dispatch console 10a are shared at which time the cloud-based token broker 30 executes a browser token grant and associated gateway token grant. This sharing of tokens effectively triggers the creation of a durable call session. In this manner, the browser-based dispatch console 10a uses its token to make a request for a specific token for the specific RoIP gateway being accessed. The browser-based dispatch console 10a then uses the granted token (i.e., only the granted token) directly to access that specific RoIP gateway.

The durable call session begins with SIP registration of the browser-based dispatch console 10a and the RoIP Gateway 11a. This occurs via the SIP registry which may be provided within the radio interface module 104 or separately formed by the SIP/RTP module 105 (discussed with regard to FIG. 2) within the RoIP Gateway 11a. Once registered, the browser-based dispatch console 10a will execute a SIP invitation to establish the durable call session between the radio interface application 104 and the browser-based dispatch console 10a. The durable call session thus enables a communications link for SRTP/RTP media flow. It should be understood as shown that the communications link between the browser-based dispatch console 10a and the Internet media module 101 is an encrypted (i.e., SRTP) media flow as such flow is incurred over the public Internet while the communications link after the Internet media module 101 is a trusted media flow with radio interface module 104 and thus unencrypted (i.e., RTP).

Upon creation of the durable call session, no communication with the radio 12a occurs until such time as the user at the browser-based dispatch console 10a executes a request (PTT ON) and is granted (PTT ACK) such by the SIP/RTP module 105 at which time the request (PTT ON) is relayed to the radio 12a. In other words, PTT ON is required for the browser-based dispatch console 10a to communicate from a dispatcher's microphone at the browser-based dispatch console 10a to the radio device 12a (and/or to other connected browsers or mobile/portable/fixed radio devices). Communications (SRTP TX Audio/RTP TX Audio/Analog Audio) will thus flow from the browser-based dispatch console 10*a* to the radio 12*a* until such time as the user at the browser-based dispatch console 10*a* executes a request (PTT OFF) relayed to the radio 12*a* to thereby relinquish the communications link by turning off the push-to-talk functionality. However, the durable call session is maintained for any communications from the radio 12*a* to the browser-based dispatch console 10*a*.

For communications initiated by the user of radio 12*a* and because a durable call session remains in place, analog audio will transmit to the radio interface module 104 whereupon execution of a voice transmission trigger (VOX ON) will be issued by the radio interface module 104, transmitted by the SIP/RTP module 105, and securely relayed over public Internet by the Internet media module 101 to the browser-based dispatch console 10*a*. This enables communications (Analog Audio/RTP RX Audio/SRTP RX Audio) will thus flow from the radio 12*a* to the browser-based dispatch console 10*a* until such time as the user at the radio 12*a* ceases talking thereby effectively executing a request (VOX OFF) to stop radio communications.

During any ongoing communications session, it should be understood that multiple requests (PTT ON/PTT OFF/VOX ON/VOX OFF) may of course be executed so as to enable ongoing two-way communications of the IP-based radio communications. The durable call session will remain open and viable unless and until the user of the browser-based dispatch console 10*a* closes out of their web-based browser, actively logs off of the browser session, or otherwise disconnects the session a command (SIP BYE) is executed and relayed to and acknowledged by (SIP OK) the SIP/RTP module thereby releasing the durable call session. This serves to eliminate the one-time-use token such that the RoIP gateway 11*a* is no longer able to transmit between the browser-based dispatch console 10*a* and the radio 12*a* until such time as a new one-time-use token is again utilized to create another durable call session.

It should be noted that the aforementioned durable call session may occur multiple times in a concurrent manner such that the RoIP gateway 11*a* effectively manages multiple IP-based radio transmissions between many radios and the browser-based dispatch console. That is to say, a plurality of durable call sessions may occur using a single RoIP gateway. Advantageously, multiple durable call sessions among radios and one or more browser-based dispatch consoles are possible with PTT calls being selectively established (PTT ON/PTT OFF/VOX ON/VOX OFF) during the durable call sessions. In this manner, radio dispatch communications are ongoing with multiple durable call sessions coexisting while each IP-based radio communication cycles on and off. Further advantages of the present invention include much reduced reliance upon cloud-based processing of the data transported by WebRTC. It should be noted that removing reliance upon cloud-based processing elements (e.g., additional servers) between the browser-based dispatch console and the RoIP gateway device provides enhanced disaster recovery due to the distributed nature of the inventive architecture where data processing is substantially limited to the end points of the system (i.e., the console and the RoIP gateway device).

It should also be understood that the present invention may be implemented in a variety of systems including, but not limited to, cloud-based 911 call-taking systems, cloud-based Computer Aided Dispatch (CAD) systems, and cloud-based Unified Communications (UC) systems.

It should be clear that the various aspects of the present invention may be implemented as software modules in an overall software system. As such, the present invention may thus take the form of computer executable instructions that, when executed, implements various software modules with predefined functions.

Additionally, it should be clear that, unless otherwise specified, any references herein to 'image' or to 'images' refer to a digital image or to digital images, comprising pixels or picture cells. Likewise, any references to an 'audio file' or to 'audio files' refer to digital audio files, unless otherwise specified. 'Video', 'video files', 'data objects', 'data files' and all other such terms should be taken to mean digital files and/or data objects, unless otherwise specified.

The embodiments of the invention may be executed by a computer processor or similar device programmed in the manner of method steps, or may be executed by an electronic system which is provided with means for executing these steps. Similarly, an electronic memory means such as computer diskettes, CD-ROMs, Random Access Memory (RAM), Read Only Memory (ROM) or similar computer software storage media known in the art, may be programmed to execute such method steps. As well, electronic signals representing these method steps may also be transmitted via a communication network.

Embodiments of the invention may be implemented in any conventional computer programming language. For example, preferred embodiments may be implemented in a procedural programming language (e.g., "C" or "Go") or an object-oriented language (e.g., "C++", "java", "PHP", "PYTHON" or "C#"). Alternative embodiments of the invention may be implemented as pre-programmed hardware elements, other related components, or as a combination of hardware and software components.

Embodiments may be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or electrical communications lines) or a medium implemented with wireless techniques (e.g., microwave, infrared or other transmission techniques). The series of computer instructions embodies all or part of the functionality previously described herein. Those skilled in the art should appreciate that such computer instructions may be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink-wrapped software), preloaded with a computer system (e.g., on system ROM or fixed disk), or distributed from a server over a network (e.g., the Internet or World Wide Web). Of course, some embodiments of the invention may be implemented as a combination of both software (e.g., a computer program product) and hardware. Still other embodiments of the invention may be implemented as entirely hardware, or entirely software (e.g., a computer program product).

A person understanding this invention may now conceive of alternative structures and embodiments or variations of the above all of which are intended to fall within the scope of the invention as defined in the claims that follow.

We claim:

1. A system for providing radio communications of data over digital networks, said system comprising:
   at least one browser-based dispatch console, said console configured to communicate using a Web Real-Time Communication (WebRTC) connection;
   at least one Radio over Internet Protocol (RoIP) gateway device for communicating with said console, said RoIP gateway device including at least an Internet media module and a radio interface module,
   wherein said RoIP gateway device processes said data between a digital domain and an analog domain,
   wherein said RoIP gateway device is directly connected to at least one analog radio device using a wired connection,
   and wherein said RoIP gateway device and said console communicate directly with each other over said WebRTC connection.

2. The system as claimed in claim 1, further comprising at least one analog radio device wherein said radio interface module converts digital audio to said analog domain to produce a resultant analog signal and transmits said analog signal to said analog radio device.

3. The system as claimed in claim 1, wherein said radio interface module converts analog audio received from said analog radio device to said digital domain to produce a resultant digital signal and transmits said digital signal to said console and said Internet media module.

4. The system as claimed in claim 1, wherein a SIP/RTP module serves as an interface between said Internet media module and said radio interface module within said RoIP gateway device, and wherein said SIP/RTP module provides data processing in said digital domain.

5. The system as claimed in claim 1, wherein said console embodies an Internet browser.

6. A method for communicating Internet Protocol (IP) based radio communications of data over digital networks, said method comprising:
   configuring at least one browser-based dispatch console to communicate said data using a Web Real-Time Communication (WebRTC) connection; and
   processing said data between a digital domain and an analog domain using a Radio over Internet Protocol (RoIP) gateway device including at least an Internet media module and a radio interface module,
   wherein said RoIP gateway device is directly connected to at least one analog radio device using a wired connection,
   and wherein said RoIP gateway device and said console communicate directly with each other over said WebRTC connection.

7. The method as claimed in claim 6, wherein said processing includes converting digital audio to said analog domain to produce a resultant analog signal and transmitting said analog signal to said at least one analog radio device.

8. The method as claimed in claim 6, wherein said processing includes converting analog audio received from said at least one analog radio device to said digital domain to produce a resultant digital signal and transmitting said digital signal to said console via said Internet media module.

9. The method as claimed in claim 6, wherein an SIP/RTP module serves as an interface between said Internet media module and said radio interface module within said RoIP gateway device, and said SIP/RTP module provides data processing to and from said digital domain.

10. The method as claimed in claim 6, wherein said data is audio data and said processing includes translating said audio data from Secure Real-Time Transport Protocol (SRTP) to Real-Time Transport Protocol (RTP) for use by said radio interface module.

11. The method as claimed in claim 10, wherein said radio interface module converts said audio data using audio codecs to said analog domain and transmits said audio data in said analog domain to said at least one analog radio device.

12. An apparatus forming a Radio over Internet Protocol (RoIP) gateway device, said apparatus comprising:
   an Internet media module for communicating with at least one browser-based dispatch console, said console configured to communicate using a Web Real-Time Communication (WebRTC) connection; and
   a radio interface module for converting audio data between analog domain and digital domain,
   wherein said RoIP gateway device is located at an edge of a network opposite said console,
   wherein said RoIP gateway device is directly connected to at least one analog radio device using a wired connection,
   and wherein said RoIP gateway device and said console communicate directly with each other over said WebRTC connection.

13. The apparatus as claimed in claim 12, wherein said radio interface module converts digital audio to said analog domain to produce a resultant analog signal and transmits said analog signal to said at least one analog radio device.

14. The apparatus as claimed in claim 12, wherein said radio interface module converts analog audio received from said at least one analog radio device to said digital domain to produce a resultant digital signal and transmits said digital signal to said console via a Session Initiation Protocol/Real-Time Transport (SIP/RTP) module and said Internet media module.

15. The apparatus as claimed in claim 12, further including a Session Initiation Protocol/Real-Time Transport (SIP/RTP) module for interfacing between said Internet media module and said radio interface module within said RoIP gateway device, said SIP/RTP module providing data processing in said digital domain.

16. The apparatus as claimed in claim 12, wherein said console embodies an Internet browser.

* * * * *